United States Patent
Bastide et al.

(10) Patent No.: US 10,394,423 B2
(45) Date of Patent: Aug. 27, 2019

(54) EFFICIENT LIST TRAVERSAL

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

(*) Notice: Subject to any disclaimer, the term of this patent is extended or adjusted under 35 U.S.C. 154(b) by 305 days.

(21) Appl. No.: 15/234,613

(22) Filed: Aug. 11, 2016

(65) Prior Publication Data

US 2018/0046681 A1 Feb. 15, 2018

(51) Int. Cl.
*G06F 3/048* (2013.01)
*G06F 3/0482* (2013.01)
*H04L 12/58* (2006.01)
*G06F 3/0484* (2013.01)

(52) U.S. Cl.
CPC ........ *G06F 3/0482* (2013.01); *G06F 3/04847* (2013.01); *H04L 51/04* (2013.01); *G06F 2203/04802* (2013.01)

(58) Field of Classification Search
CPC ..... G06F 17/30554; G06F 2203/04802; H04L 51/04; H05K 999/99
See application file for complete search history.

(56) References Cited

U.S. PATENT DOCUMENTS

| | | | |
|---|---|---|---|
| 6,154,740 A | 11/2000 | Shah | |
| 7,133,859 B1 | 11/2006 | Wong | |
| 7,921,174 B1* | 4/2011 | Denise | G06Q 10/107 709/206 |
| 8,281,258 B1 | 10/2012 | Dixon et al. | |
| 8,375,316 B2 | 2/2013 | Stallings et al. | |
| 8,561,008 B2* | 10/2013 | Steiner | G06F 9/451 717/100 |
| 8,893,040 B2 | 11/2014 | Pascal et al. | |
| 8,997,018 B2 | 3/2015 | Cheng | |
| 9,015,639 B2* | 4/2015 | Yoo | G06F 3/0482 715/863 |

(Continued)

OTHER PUBLICATIONS

Peter Mell et al, The NIST Definition of Cloud Computing, National Institute of Standards and Technology, Publication 800-145, 2011.

*Primary Examiner* — Linh K Pham
(74) *Attorney, Agent, or Firm* — Patrick J. Daugherty; Daugherty & Del Zoppo Co., LPA

(57) ABSTRACT

With respect to data items presented in structured, sorted listing having an initial arrangement positioning of the data items relative to each other, aspects select a subset group of the data items having values in a data field selected within one of the items and that share a common value within a different data field. The selected data field is replaced within the selected data item by a roller widget having data values of the selected field of each of the first data item and of the subset of data items. Thus, the roller widget is enabled to scroll through the data values while the unselected data items of the structured list are continually displayed in their initial arrangement positioning relative to each other and to the roller widget in place of the selected data field.

14 Claims, 7 Drawing Sheets

(56) References Cited

U.S. PATENT DOCUMENTS

| | | | |
|---|---|---|---|
| 2002/0120695 A1* | 8/2002 | Engstrom | G06Q 10/107 709/206 |
| 2004/0260756 A1* | 12/2004 | Forstall | G06Q 10/107 709/200 |
| 2006/0200530 A1* | 9/2006 | Tokuda | H04L 51/14 709/206 |
| 2008/0162651 A1* | 7/2008 | Madnani | G06Q 10/107 709/206 |
| 2009/0029674 A1* | 1/2009 | Brezina | H04M 15/00 455/405 |
| 2009/0327956 A1 | 12/2009 | Porat | |
| 2011/0099500 A1* | 4/2011 | Smith | G06F 3/0482 715/771 |
| 2012/0131497 A1* | 5/2012 | Jitkoff | G06F 3/0481 715/786 |
| 2012/0317657 A1* | 12/2012 | Glimcher | G06Q 30/0603 726/29 |
| 2014/0096033 A1* | 4/2014 | Blair | G06F 3/01 715/752 |
| 2014/0331187 A1* | 11/2014 | Hicks | G06F 3/0488 715/845 |
| 2016/0065526 A1* | 3/2016 | Lagadapati | H04L 51/28 709/206 |

\* cited by examiner

EFFICIENT LIST TRAVERSAL

BACKGROUND

Embodiments of the present invention relate to selecting, sorting and viewing data item selections meeting selection criteria from a universal set of data items.

In order to traverse lists or other data set compilations to search for one or more items meeting a selection criteria, users must generally scroll through and manually review a number of items in order to determine if each item meets or is relevant to the selection criteria. Automated sorting procedures may redraw a graphical user interface (GUI) presentation of data items, such as listing a group of emails originally sorted by time and date into another listing sorted by a selected filed value (for example, name, date, subject line component, etc.). Such approaches generally result in a screen display redrawing that loses a current position relative to other items in a displayed list of a selection of a universe of possible data items. In order to return to an original list display, the sort generally needs to be reset, which sometimes requires multiple steps by the user (for example, several mouse clicks are needed, to step through different ascending or descending field value sorts), in order to return to a desired or original view.

BRIEF SUMMARY

In one aspect of the present invention, a computerized method for efficient traversal of lists of data items executes steps on a computer processor. Thus, a computer processor drives a graphical user interface display to present a structured listing of data items sorted into an initial arrangement positioning relative to each other with respect to a sorting criteria, wherein each of the data items has a plurality of data fields. In response to a selection of a first of the data fields of a first of the data items, the processor selects a subset group of the plurality of data items that each have values in the selected first data field and that share a common value within a second of the data fields that is different from the first data field. The processor replaces the selected data field within the first data item with a roller widget that has data values of the selected first field of the first data item and of each of the generated subset group of the data items. Thus, the processor drives a display of the roller widget to scroll through the roller widget data values in response to an input from the user, while a remainder of the unselected data items of the structured list are continually displayed in their initial arrangement positioning in the displayed structured list relative to each other and to the roller widget in place of the selected data field.

In another aspect, a system has a hardware processor in circuit communication with a computer readable memory and a computer-readable storage medium having program instructions stored thereon. The processor executes the program instructions stored on the computer-readable storage medium via the computer readable memory and thereby drives a graphical user interface display to present a structured listing of data items sorted into an initial arrangement positioning relative to each other with respect to a sorting criteria, wherein each of the data items has a plurality of data fields. In response to a selection of a first of the data fields of a first of the data items, the processor selects a subset group of the plurality of data items that each have values in the selected first data field and that share a common value within a second of the data fields that is different from the first data field. The processor replaces the selected data field within the first data item with a roller widget that has data values of the selected first field of the first data item and of each of the generated subset group of the data items. Thus, the processor drives a display of the roller widget to scroll through the roller widget data values in response to an input from the user, while a remainder of the unselected data items of the structured list are continually displayed in their initial arrangement positioning in the displayed structured list relative to each other and to the roller widget in place of the selected data field.

In another aspect, a computer program product for efficient traversal of lists of data items has a computer-readable storage medium with computer readable program code embodied therewith. The computer readable hardware medium is not a transitory signal per se. The computer readable program code includes instructions for execution which cause the processor to drive a graphical user interface display to present a structured listing of data items sorted into an initial arrangement positioning relative to each other with respect to a sorting criteria, wherein each of the data items has a plurality of data fields. In response to a selection of a first of the data fields of a first of the data items, the processor selects a subset group of the plurality of data items that each have values in the selected first data field and that share a common value within a second of the data fields that is different from the first data field. The processor replaces the selected data field within the first data item with a roller widget that has data values of the selected first field of the first data item and of each of the generated subset group of the data items. Thus, the processor drives a display of the roller widget to scroll through the roller widget data values in response to an input from the user, while a remainder of the unselected data items of the structured list are continually displayed in their initial arrangement positioning in the displayed structured list relative to each other and to the roller widget in place of the selected data field.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
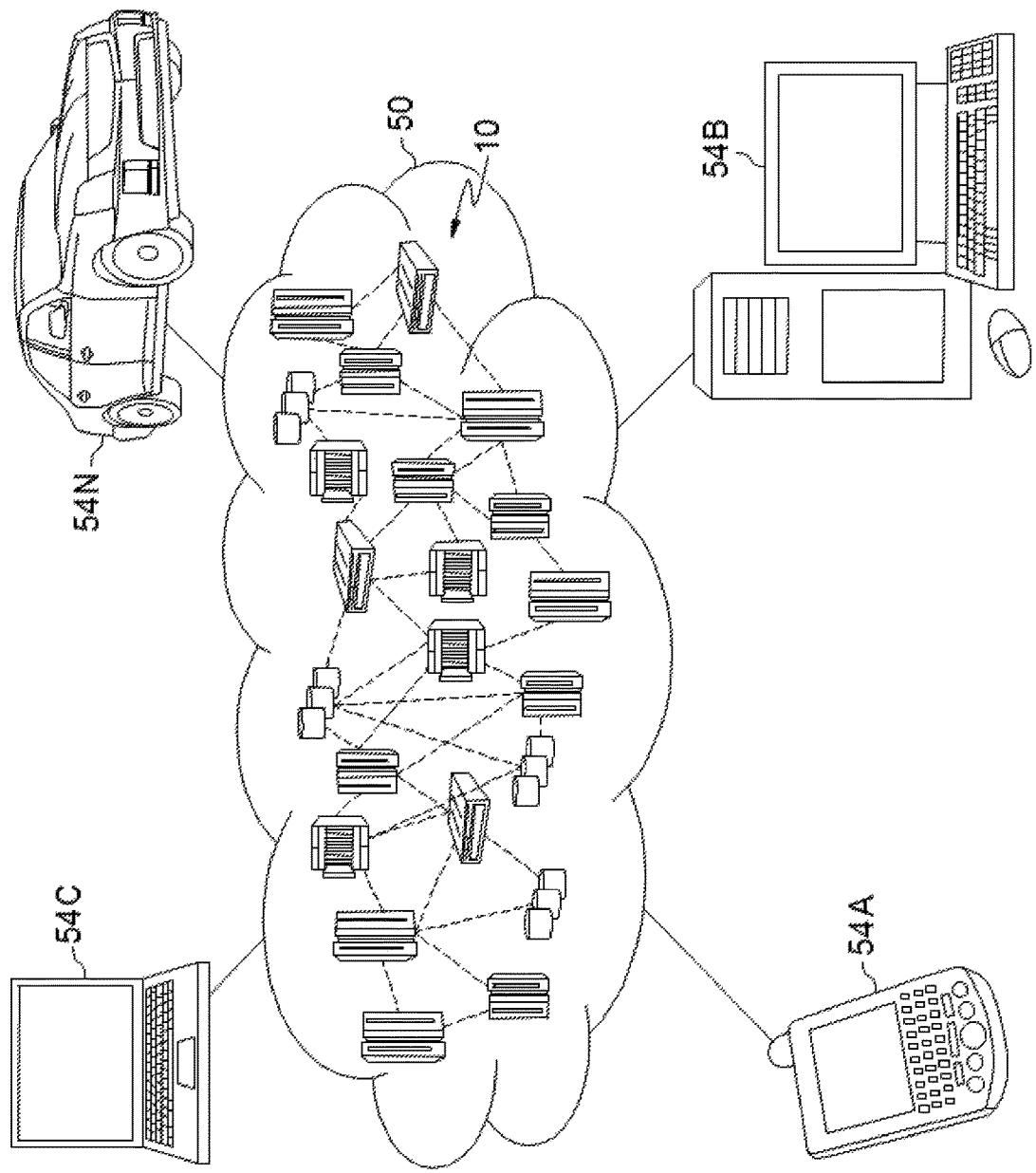
FIG. 1 depicts a cloud computing environment according to an embodiment of the present invention.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
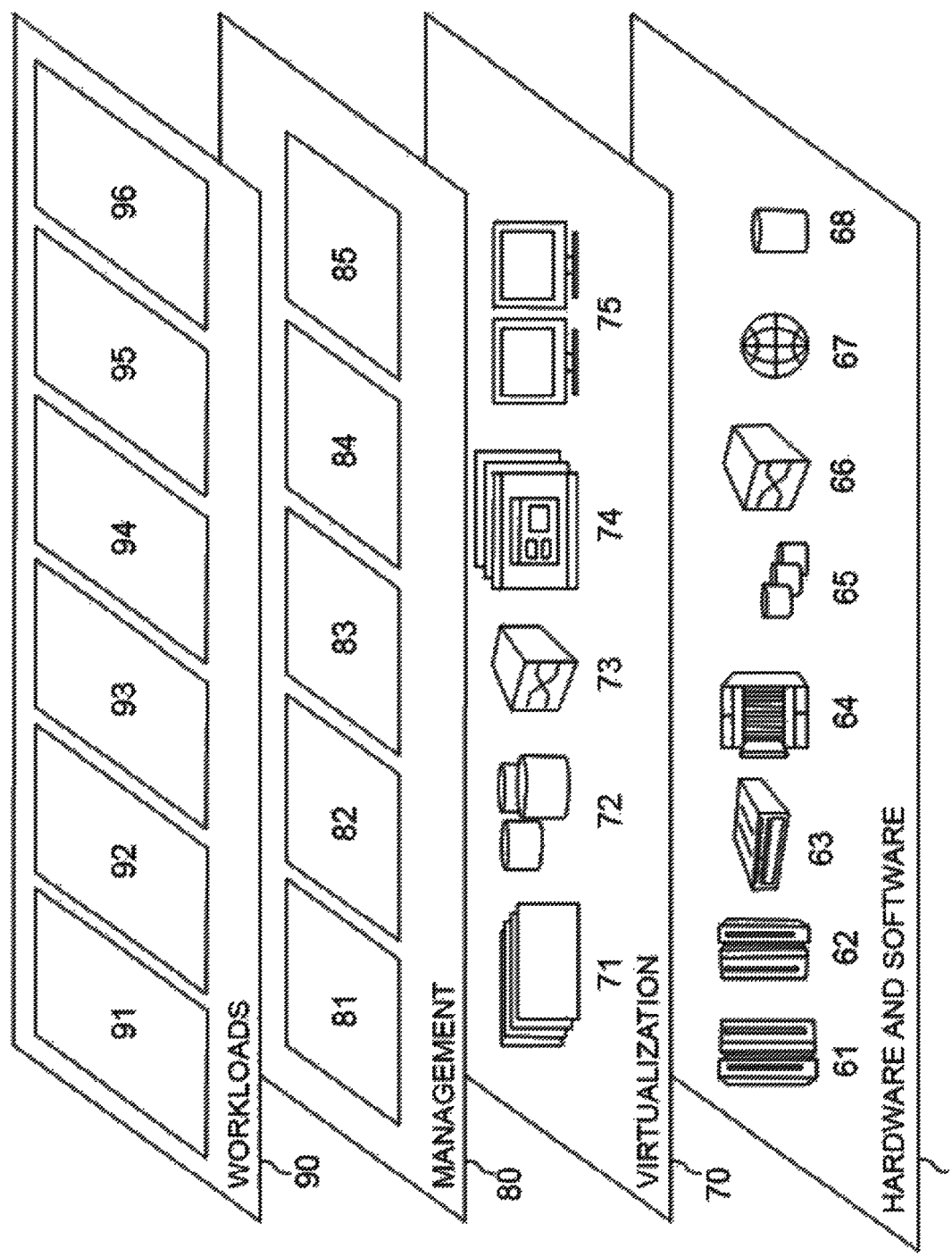
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
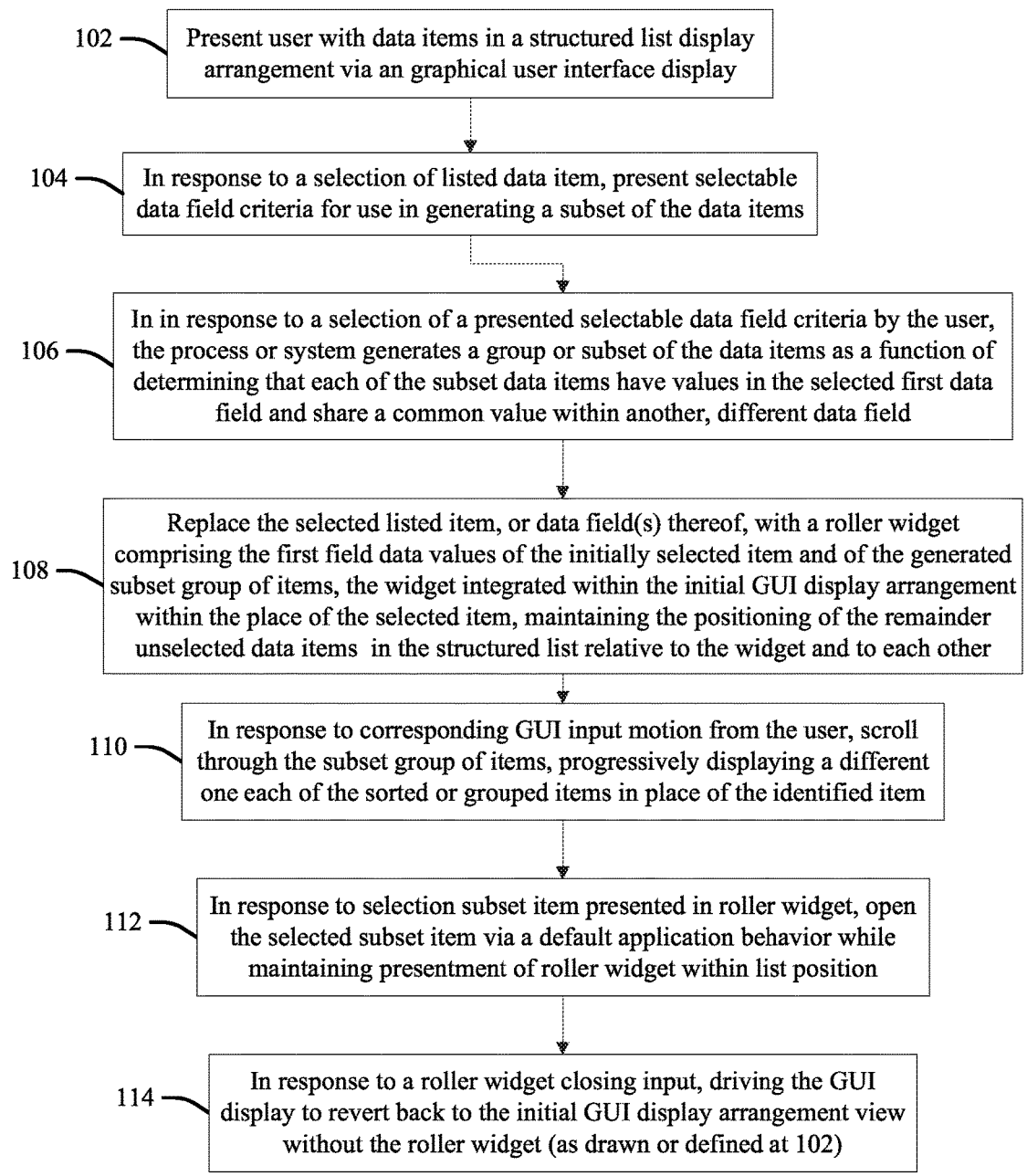
FIG. 4 is a flow chart illustration of a process or system for efficient traversal of lists of data items according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 according to embodiments of the present invention for efficient traversal of lists of data items, for example to execute the process steps or system components or tasks as depicted in FIG. 4 below.

Figure 3:
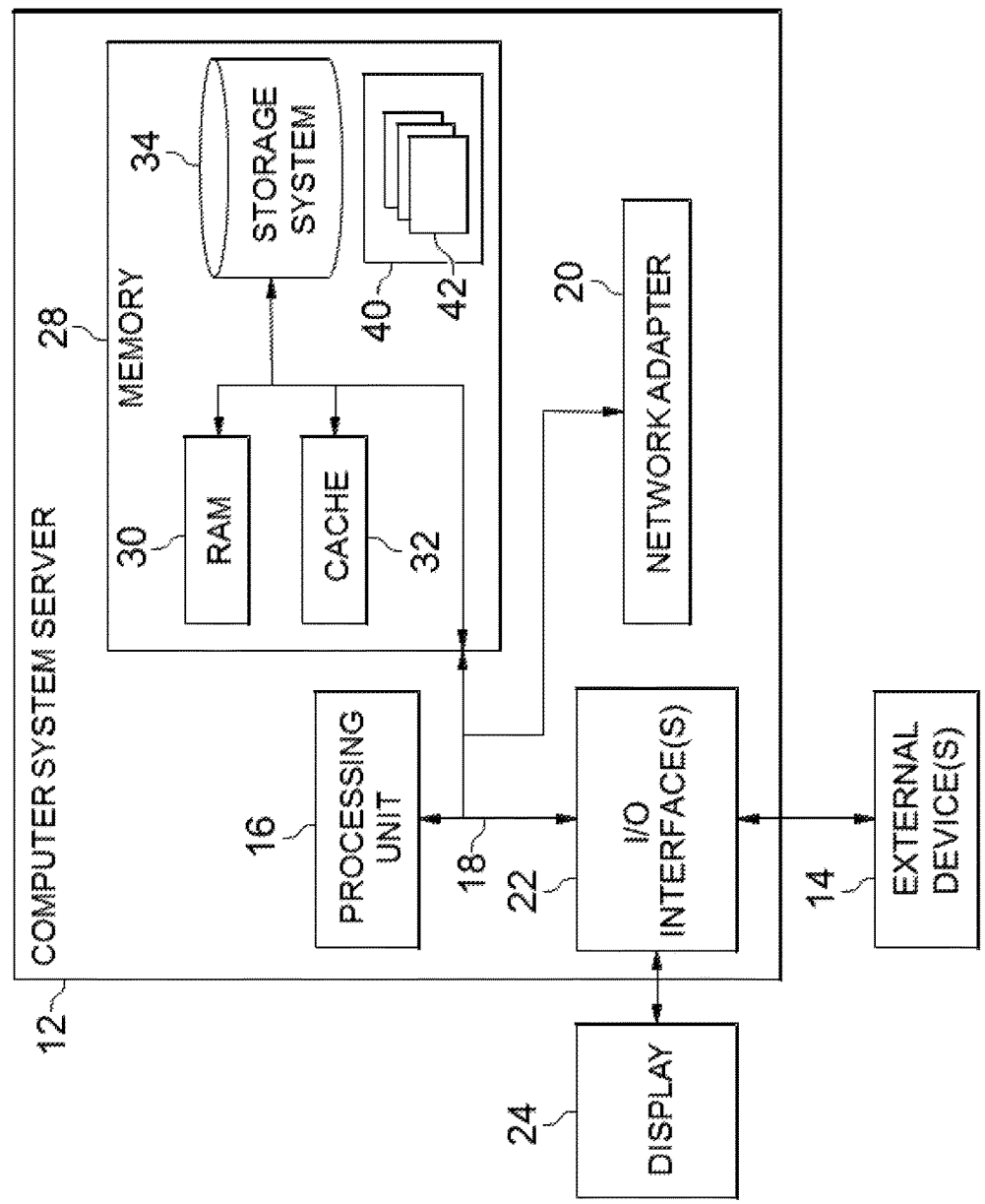
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Traversing lists or other data set compilations under prior art systems and methods in order to search for one or more items meeting a selection criteria may be cumbersome and inefficient. Often a user must scroll through and manually review a number of items in order to determine if any item meets or is relevant to the selection criteria. Automated sorting procedures generally require a user viewing a list of items such as emails or tasks to sort them by a selected filed value (for example, name, date, subject, etc.), which results in a screen display redrawing that loses a current position in a displayed list. It may also create an entirely new list or visual presentation of a different set of data items.

In order to return to an original list display in the prior art a sort structure generally needs to be reset, which sometimes requires a cumbersome or confusing combination of multiple steps by the user. For example, a user may be required to step through in a specific, sequential or dependent sequence several graphical user interface (GUI) mouse clicks input, for example, to execute a series of different ascending or descending field value sorts, in order to return to a desired or original view. If a user forgets or omits any of the steps, in the prior art that user may fail to recreate or otherwise return to a desired original data display view or similar.

Disadvantages of prior art solutions include condition precedent sorting column requirements, time-consuming procedures that must be executed to switch between sort views. User must have skill and knowledge sets required to efficiently generate and apply an appropriate filter, which may be problematic with regard to dynamically changing and widely-variable field values (such as "subject line" field values within emails). Email rules may also complicate search targets, for example a rule may differentially send emails to different folders from an inbox. Generally these examples require switching a current view of the user to find the target item, such as from an inbox to another, specified folder, then switching back.

FIG. 4 illustrates a process or system according to the present invention for efficient traversal of lists of data items. At 102 a user is presented with a structured list display arrangement of a plurality of data items via an graphical user interface (GUI) display (for example, a list, a table, a spreadsheet, etc.). In one example, the structured list is a plurality of message data items that are identified or distinguished relative to each other by different date, subject, name, or other data field values.

Generally, the selectable criteria are displayed as superimposed over, or integrated in-line with, the selected data item: thus, aspects of the present invention maintain relative positioning within the structured list of the data items relative to the positions of other data items in the initial GUI display arrangement list. However, some aspects may use pop-up windows or other displays that extend beyond alignment of the selected item within the current structured list view.

At 104, in response to a selection of one of the listed data items by the user, the process or system drives the GUI display to present selectable data field criteria to the user for use in sorting or grouping a subset of the data items.

In some aspects, one or more of the data fields of the selected data item are indicated as selectable data fields and differentiated from other, non-selectable data fields, such as by differential highlighting, font or other visible presentation, etc. It will also be appreciated by one skilled in the art that data items and data field selections may be generally made by the user through a variety of means. Illustrative but not limiting or exhaustive examples include via a GUI touchscreen input by the user, such as hovering over a particular column; clicking on a column name via a GUI cursor routine (for example, via mouse or touchpad selection); a voice command (for example, "select email from Janet with subject nachos"), and still other selection routines will be apparent to one skilled in the art.

At 106, in response to a selection of one (a first) of the presented selectable data field criteria by the user, the process or system generates (selects) a group or subset of the data items as a function of determining that each of the subset data items have values in the first data field and share a common value within another, different (second) data field. More particularly, the listed data items have at least two distinct data fields, wherein one may be selected for sorting or grouping, and another has a different filed value that is used to define the group through a common value. The other, second "organizing" field may be identified and selected by the user as well, or it may be selected by default or predefined preference or rule, for example in response to identification of the selected first data field.

The step of generating the subset may include sorting or ranking, for example, ranked by relative differences between respective field values of the first selected data field. Thus, aspects may rank the subset group items by their first field values alphanumerically, by ascending or descending order of numeric values, by relative proximity to time of message to a selected message item (for example, proximity to a "time received" field value of the value of "time received" field of the selected data item and/or "time received" field of the selected item), etc. Sorting or ranking may be based on pre-set filed value combinations, configurations or policies. In one example, selection of any secondary fields displayed within the data item will generate a subset of items that have data that also match a value of an unselected primary field, such as all listed email messages having the same "sender" field value as the selected data item.

At 108 the system or process replaces the identified item, or at least one of its data fields, within the initial GUI display arrangement with a roller widget that represents (comprises) the first field data values of the initially selected item and of the generated subset group of items, wherein the remainder, unselected data items of the structured list maintain their positioning in the list relative to the roller widget as substitute for the selected item, and relative to one another as they originally appear within the list. More particularly, the roller widget is superimposed or integrated in-line within the place of the selected item or its first data field in the initial GUI display arrangement, so a list of the generated subset items may be rolled or scrolled through by operation of the roller widget, while the remainder unselected data items of the structured list are continually displayed to the user and maintain their positioning in the initial GUI display arrangement relative to the roller widget in substitution of the selected data item.

At 110, in response to a corresponding GUI input motion from the user (for example, a finger-tip swipe upward or downward), the system or process scrolls through the subset group of items, progressively displaying a different one each of the sorted or grouped items in place of the identified item. For example, in response to a finger-tip motion upward, the roller widget rolls a display of the subset items upward (forwards through their relative sorted or grouped position) within the subset grouping and in the position of the roller widget within the initial GUI display arrangement, or downward (backwards through their relative sorted or grouped position) in response to a downward motion of the user GUI input. During this process, the remainder unselected data items of the structured list maintain their positioning in the initial GUI display arrangement relative to the roller widget in substitution of the selected data item.

In some aspects, the roller widget is activated by a specific user input at 110. Examples include faster scroll up or scroll down motions that indicate activation of the roller widget, relative to slower up or down motions that instead indicate that the user wishes to close or leave the roller widget inactive for presentation of scrolling listings of the subset items. Activate or non-activate signals may also be distinguished by different motions or sequences of motions, and further over specified time rates or signatures, such as motions in different directions (for example, up and down motions versus side-to-side), or matching a specified sequence of motions (for example, a side-to-side swipe followed by an up or down swipe may indicate both activate and scroll the widget in the direction of the up or down swipe).

At 112, in response to a selection of one of the subset items presented in the roller widget, the process or system opens the selected subset item via a default application behavior, again while maintaining presentment of initial GUI display arrangement with roller widget (for example, as another window, or in the background of a presentation of the opened item). In one example where the selected item is an email message, the selected email message is opened in an email viewer in a separate window that is selectable as active over a current window displaying the initial GUI display arrangement with the roller widget.

At 114, in response to a roller widget closing input, the system or process causes (drives) the GUI display to revert back to the initial GUI display arrangement view without the roller widget (as drawn or defined at 102) in response to a user "revert-back" input. Examples of the revert-back process include the user closing the roller widget, or the new window opened at 112; and by automatic operation, such as in response to determining that the user motion input at 110 causes the roller widget to scroll completely through the entire subset sorted or grouped list without any selection by the user at 112 of any of the presented subset items.

In some aspects, activation of the roller widget may cause the roller widget to present sort options by a popup display, for example, at a different zoom level, shading or brightness level relative to the remainder, unselected data items of the structured list maintaining their positioning in the list relative to the roller widget as substitute for the selected item. Aspects may also present data items from the subset list that are alternatives to the selected item in different layers or lightboxes which can themselves be efficiently sorted.

Aspects may recognize and utilize a variety of differentiated input motions and gestures to distinguish between user inputs use to active, drive and close the roller widget. For example, activation of the roller widget may be based on recognizing a fast scroll-up or scroll-down gesture input from a user finger on a touch screen, or a combination of either of such gestures with another gesture (in contrast to a slower scroll-up or scroll-down gesture, or to a single gesture, or to a different gesture, etc.)

Figure 5:
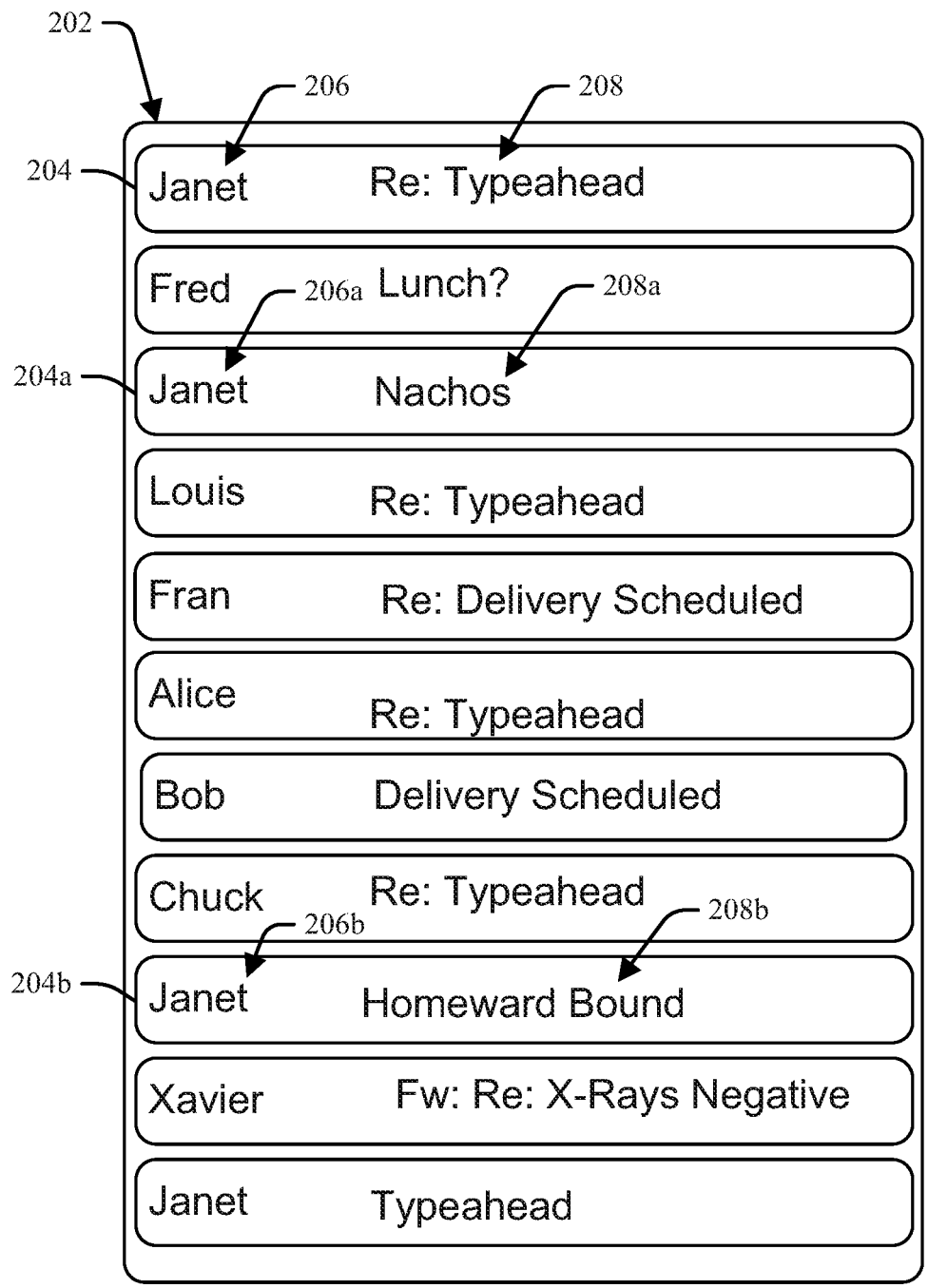
FIG. 5 is a graphic illustration of a structured list of data items according to an aspect of the present invention.

FIG. 5 is a graphic illustration of an initial GUI display of a structured list 202 of different text, chat or email message data items 204 that each identify sender field data values 206 and subject field data values 208 of the different messages 204. The listing 202 organizes the messages 204 relative to each other as a function of time of receipt, or by some other categorizing attribute wherein each message 204 has a unique value or combination of field values relative to the other messages 204. Within the list 202 a first one of the messages 204*a* has a "sent from" field value 206*a* of "Janet" and a subject field value 208*a* of "Nachos," and a different, second message 204*b* has a "sent from" field value 206*b* with a same or common value ("Janet") but a different subject field value 208*b* value ("Homeward Bound") relative to the first message 204*a*.

Figure 6:
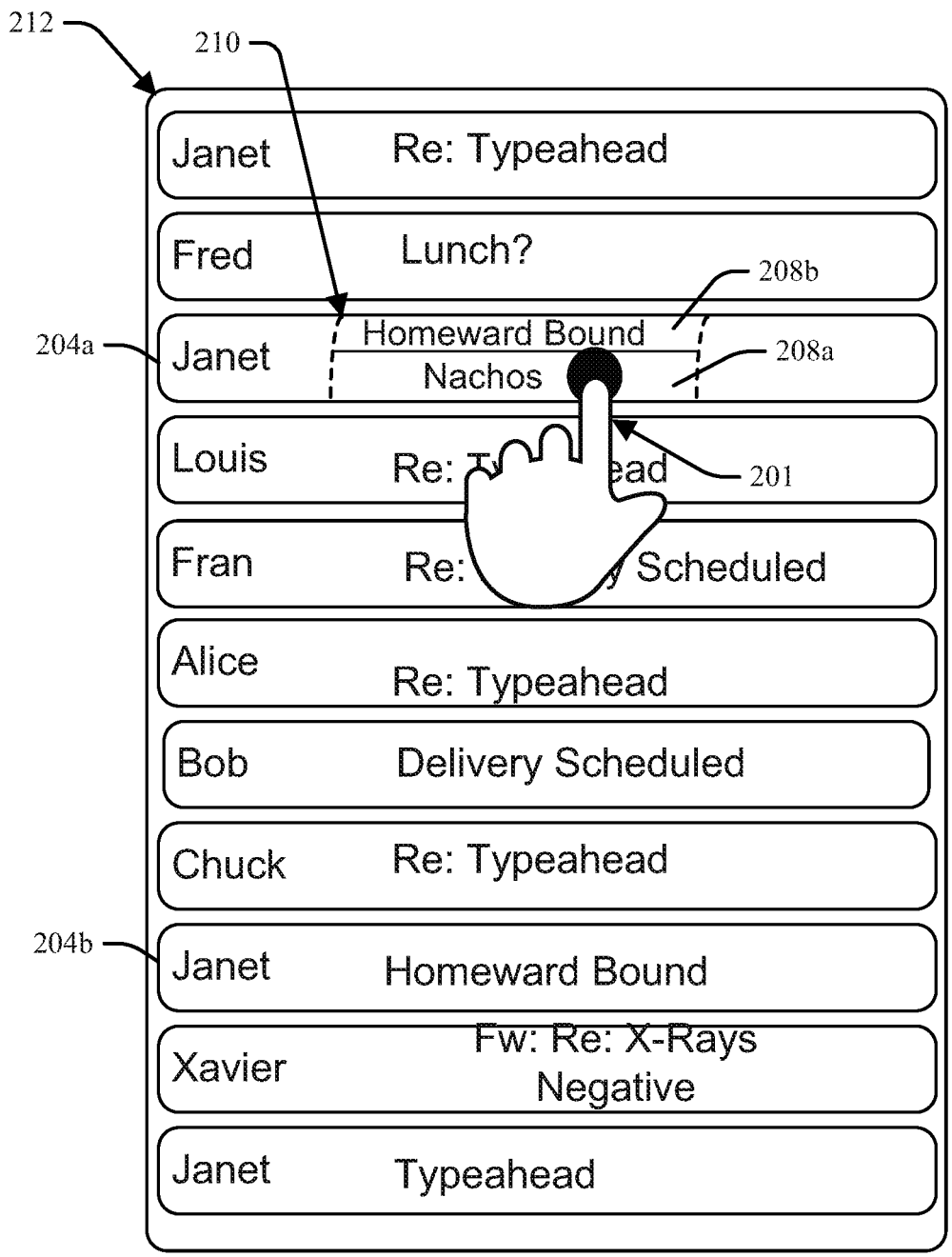
FIG. 6 is a graphic illustration of a structured list of data items according to an aspect of the present invention.

FIG. 6 illustrates another list 212 view after the first message 204*a* is identified or selected (at 104 of FIG. 4) from the view 202 of FIG. 5, for example, by a finger tap on a touch-sensitive GUI display device presenting the list 202. The user is given a choice of generating a subset of the messages 204 based on matching or sorting/ranking via the values of one of the two sender 206 and subject 208 fields. The present example illustrates a selection of the sender field value 206 as the second grouping or organizing field (either by the user or by preference or rule), in response of selection by the user touch input 201 of the subject field 208 as the selectable data field criteria (at 106), wherein each of the subset items will have a common value of "Janet."

The subject field value 208*a* of the selected message 202*a* is responsively replaced by a roller widget 210 (at 108 of FIG. 4) that lists the different subject field values 208 of each of the subset of messages that each have the common sender field value 206 of "Janet". In this view, the roller widget 210 displays the current subject field value 208*a* ("Nachos") of the selected first message 204*a* as well as the subject field value 208*b* value ("Homeward Bound") of the second message 204*b* having the common field value 206 of "Janet".

In the present example list view 212 of FIG. 6 the other messages 204 (inclusive of the second message 204*b*) of the initial view 202 for FIG. 5 are depicted in their same positions relative to each other and to the selected message 204*a*. In some aspects, the other messages may be differentially depicted, for example with graphic shading and/or text font values "grayed out" or diminished to their values in the initial list view 202, indicating that they are inactive for selection by touch or other GUI selection routine 201 while the roller widget 210 is active for such a selection.

By swiping upward or downward on the roller widget 210 the user can scroll through all of the different values of the subject field value 208 of the subset messages, and the user can select any one of the subject field values 208 presented in a current position of the roller widget 210.

Figure 7:
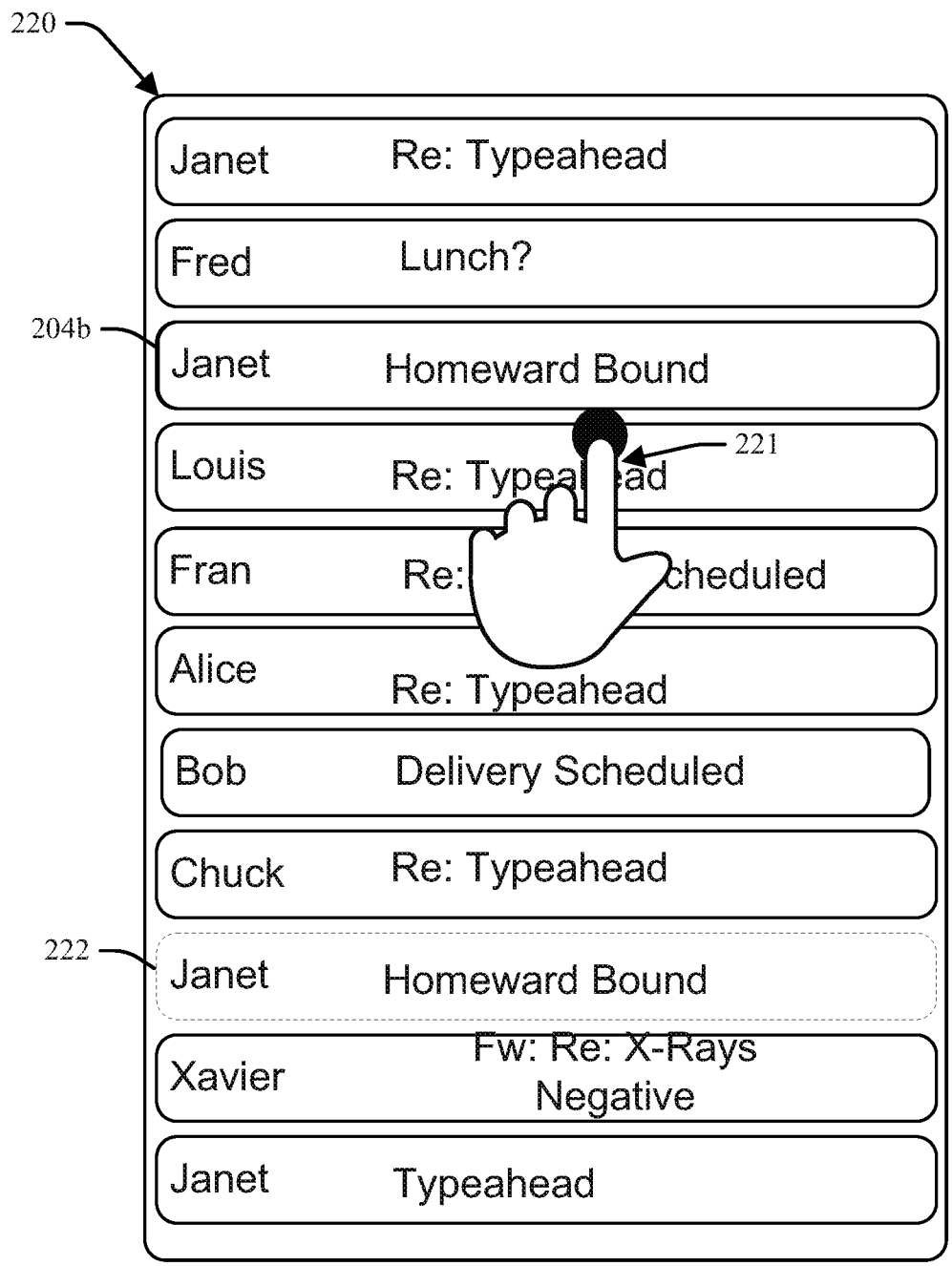
FIG. 7 is a graphic illustration of a structured list of data items according to an aspect of the present invention.

FIG. 7 illustrates another structured list presentation 220 of the messages 204 after selection of the "Homeward Bound" subject field value 208*b* from the roller widget 210, wherein the second message 204*b* that contains this field value is moved up to the position of and replaces the roller widget 210 (which itself replaced the first message 204*a* presentation), and wherein the relocated second message 204*b* may be opened (at 112, FIG. 4) in response to a touch screen selection 221. The original position of the second message 204*b* relative to the other messages 204 in the initial list view 202 is indicated to the viewing user by a dotted line representation 222 of the moved second message 204*b*. Thus, the viewing user is enabled to select the second message item 204*b* to open or view the associated data item, while otherwise maintaining the relative order of the other messages 204 as presented in the current view 220 relative to the initial, original view 202, except for the moved second message 204*b*. The relative message 204 listing is otherwise still in a same or similar, corresponding order, keeping the viewing user substantially oriented to the data structure listed in the original view 202.

If instead the user opts not to open the relocated message 204b, the user may close the active selection, and the view may revert back to the list view 202 of FIG. 5. Thus, the present aspect minimizes the effort required by the user to traverse data item subsets within a current view arrangement of list structure, and to revert back to the original view as desired.

Aspects of the present invention provide advantages over the prior art by traversing through data lists in a more efficient manner relative to the prior art, which may be particularly advantageous when the header selections are in small areas (such as on mobile devices). Aspects leverage available mechanisms, including other "scrolling" user interface widgets and dynamic background content clustering and grouping applications and structures that will be known to one skilled in the art. Aspects enable a user to select a single data item, group subset or remaining others of the data items based on a common attribute or their respective relative differences to a selected field value, and scroll lists of grouped items "in place," wherein the original data list presented to the user prior to the item selection is maintained and continually presented to the user, so that the user may quickly revert back to said original view by closing or terminating the widget. Advantages of the present inventions include providing an improved mobile device application experience, maintaining data context in relation to other existing items in a list, and executing fast, intuitive and efficient sorting actions on list or table items.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor:

presenting, via a graphical user interface display, a display of a structured listing of a plurality of data items sorted into an initial arrangement positioning relative to each other with respect to a sorting criteria, wherein each of the plurality of data items comprises a plurality of data fields;

in response to a selection of a first of the data fields of a first of the data items within the display of the structured listing of the plurality of data items sorted into the initial arrangement positioning relative to each other, selecting a subset group of the plurality of data items that each have values in the selected first data field and that share a common value within a second of the data fields that is different from the first data field;

replacing the selected data field of the first data item within a display of the structured listing of the plurality of data items sorted into the initial arrangement positioning relative to each other with a display of a roller widget, wherein the roller widget is associated to data values of the selected first field of the first data item and of each of the generated subset group of the data items;

presenting, via the graphical user interface display, a display of the roller widget within the selected data field of the first data item that is configured to scroll through displays of the associated roller widget data values in response to an input from the user, while continually displaying the remainder of unselected data items of the structured list in the initial arrangement positioning in the displayed structured list relative to each other and to the first data item comprising the roller widget in place of the selected data field;

in response to a roller widget closing input, driving the graphical user interface display to close the roller widget and to revert back to the display of the structured listing of the plurality of data items sorted into the initial arrangement positioning relative to each other; and generating the roller widget closing input in response to determining that the roller widget has scrolled through and displayed all of the roller widget data values, and that none of the displayed roller widget data values have been selected by a user input.

2. The method of claim 1, further comprising:

integrating computer-readable program code into a computer system comprising a processor, a computer readable memory and a computer readable storage medium, wherein the computer readable program code is embodied on the computer readable storage medium and comprises instructions that, when executed by the processor via the computer readable memory, cause the processor to perform the presenting via the graphical user interface the display of the structured listing of the plurality of data items sorted into the initial arrangement positioning relative to each other, the selecting the subset group of the plurality of data items in response to the selection of the first of the data fields of the first of the data items, the replacing the selected data field within the first data item with the roller widget, the presenting via the graphical user interface display the roller widget within the presented revised structured listing that is configured to scroll through the roller widget data values in response to an input from the user, the driving the graphical user interface display to close the roller widget and to revert back to the display of the structured listing of the plurality of data items sorted into the initial arrangement positioning relative to each other, and the generating the roller widget closing input in response to determining that the roller widget has scrolled through and displayed all of the roller widget data values, and that none of the displayed roller widget data values have been selected by a user input.

3. The method of claim 2, wherein the computer-readable program code is provided as a service in a cloud environment.

4. The method of claim 1, further comprising:
activating the roller widget to scroll through the first field data values of the selected data item and the generated subset group of data items in response to distinguishing a specific graphical user interface input from another, different graphical user interface input, as a function of a relative difference in input motion direction data or in speed of input motion.

5. The method of claim 1, further comprising:
in response to a selection of one of the field data values presented in the roller widget, opening a data item of the selected field data value presented in the roller widget via a default application behavior, while continually displaying the remainder unselected data items in the initial arrangement positioning in the displayed structured list relative to each other and to the first data item comprising the roller widget in place of the selected data item.

6. The method of claim 1, further comprising:
selecting the second of the data fields having the common value in response to a predefined relationship of the second data field to the selected first data field.

7. A system, comprising:
a processor that is in communication with a graphical user interface display;
a computer readable memory in circuit communication with the processor; and
a computer readable storage medium in circuit communication with the processor;
wherein the processor executes program instructions stored on the computer-readable storage medium via the computer readable memory and thereby:
drives the graphical user interface display to present a display of a structured listing of a plurality of data items sorted into an initial arrangement positioning relative to each other with respect to a sorting criteria, wherein each of the plurality of data items comprises a plurality of data fields;
in response to a selection of a first of the data fields of a first of the data items within the display of the structured listing of the plurality of data items sorted into the initial arrangement positioning relative to each other, selects a subset group of the plurality of data items that each have values in the selected first data field and that share a common value within a second of the data fields that is different from the first data field;
replaces the selected data field of the first data item within a display of the structured listing of the plurality of data items sorted into the initial arrangement positioning relative to each other with a display of a roller widget, wherein the roller widget is associated to data values of the selected first field of the first data item and of each of the generated subset group of the data items;
drive the graphical user interface display to present a display of the roller widget within the selected data field of the first data item that is configured to scroll through displays of the associated roller widget data values in response to an input from the user, while continually displaying the remainder of unselected data items of the structured list in the initial arrangement positioning in the displayed structured list relative to each other and to the first data item comprising the roller widget in place of the selected data field;
in response to a roller widget closing input, drive the graphical user interface display to close the roller widget and to revert back to the display of the structured listing of the plurality of data items sorted into the initial arrangement positioning relative to each other; and
generate the roller widget closing input in response to determining that the roller widget has scrolled through and displayed all of the roller widget data values, and that none of the displayed roller widget data values have been selected by a user input.

8. The system of claim 7, wherein the processor executes program instructions stored on the computer-readable storage medium via the computer readable memory and thereby:
activates the roller widget to scroll through the first field data values of the selected data item and the generated subset group of data items in response to distinguishing a specific graphical user interface input from another, different graphical user interface input, as a function of a relative difference in input motion direction data or in speed of input motion.

9. The system of claim 7, wherein the processor executes program instructions stored on the computer-readable storage medium via the computer readable memory and thereby:
in response to a selection of one of the field data values presented in the roller widget, opens a data item of the selected field data value presented in the roller widget via a default application behavior, while continually displaying the remainder unselected data items in the initial arrangement positioning in the displayed structured list relative to each other and to the first data item comprising the roller widget in place of the selected data item.

10. The system of claim 7, wherein the processor executes program instructions stored on the computer-readable storage medium via the computer readable memory and thereby:
selects the second of the data fields having the common value in response to a predefined relationship of the second data field to the selected first data field.

11. A computer program product for optimizing competitive bidding processes for energy suppliers as a function of energy block denominations, the computer program product comprising:
a computer readable storage medium having computer readable program code embodied therewith, wherein the computer readable storage medium is not a transitory signal per se, the computer readable program code comprising instructions for execution by a processor that cause the processor to:
drive a graphical user interface display to present a display of a structured listing of a plurality of data items sorted into an initial arrangement positioning relative to each other with respect to a sorting criteria, wherein each of the plurality of data items comprises a plurality of data fields;
in response to a selection of a first of the data fields of a first of the data items within the display of the structured listing of the plurality of data items sorted into the initial arrangement positioning relative to each other, select a subset group of the plurality of data items that each have values in the selected first data field and that share a common value within a second of the data fields that is different from the first data field;

replace the selected data field of the first data item within a display of the structured listing of the plurality of data items sorted into the initial arrangement positioning relative to each other with a display of a roller widget, wherein the roller widget is associated to data values of the selected first field of the first data item and of each of the generated subset group of the data items; and drive the graphical user interface display to present a display of the roller widget within the selected data field of the first data item that is configured to scroll through displays of the associated roller widget data values in response to an input from the user, while continually displaying the remainder of unselected data items of the structured list in the initial arrangement positioning in the displayed structured list relative to each other and to the first data item comprising the roller widget in place of the selected data field;

in response to a roller widget closing input, drive the graphical user interface display to close the roller widget and to revert back to the display of the structured listing of the plurality of data items sorted into the initial arrangement positioning relative to each other; and generate the roller widget closing input in response to determining that the roller widget has scrolled through and displayed all of the roller widget data values, and that none of the displayed roller widget data values have been selected by a user input.

12. The computer program product of claim 11, wherein the computer readable program code comprising instructions for execution by the processor that cause the processor to:

activate the roller widget to scroll through the first field data values of the selected data item and the generated subset group of data items in response to distinguishing a specific graphical user interface input from another, different graphical user interface input, as a function of a relative difference in input motion direction data or in speed of input motion.

13. The computer program product of claim 11, wherein the computer readable program code comprising instructions for execution by the processor that cause the processor to:

in response to a selection of one of the field data values presented in the roller widget, open a data item of the selected field data value presented in the roller widget via a default application behavior, while continually displaying the remainder unselected data items in the initial arrangement positioning in the displayed structured list relative to each other and to the first data item comprising the roller widget in place of the selected data item.

14. The computer program product of claim 11, wherein the computer readable program code comprises instructions for execution by the processor that cause the processor to:

select the second of the data fields having the common value in response to a predefined relationship of the second data field to the selected first data field.

* * * * *